(12) United States Patent
Burch et al.

(10) Patent No.: US 10,798,068 B2
(45) Date of Patent: *Oct. 6, 2020

(54) WIRELESS INFORMATION PASSING AND AUTHENTICATION

(71) Applicant: NetIQ Corporation, Provo, UT (US)

(72) Inventors: Lloyd Leon Burch, Payson, UT (US); Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,177

(22) Filed: May 4, 2018

(65) Prior Publication Data

US 2018/0255032 A1    Sep. 6, 2018

Related U.S. Application Data

(63) Continuation of application No. 14/689,778, filed on Apr. 17, 2015, now Pat. No. 9,998,430.

(51) Int. Cl.
*H04L 29/06* (2006.01)
*H04W 12/06* (2009.01)
*H04W 12/02* (2009.01)

(52) U.S. Cl.
CPC ........ *H04L 63/0428* (2013.01); *H04L 63/102* (2013.01); *H04L 63/123* (2013.01); *H04W 12/06* (2013.01); *H04L 63/18* (2013.01); *H04W 12/02* (2013.01)

(58) Field of Classification Search
CPC ..... H04W 12/06; H04W 4/008; H04W 12/02; H04W 12/08; H04B 10/116; H04L 63/0853; H04L 63/0428; H04L 63/102; H04L 63/123; H04L 63/18

See application file for complete search history.

(56) References Cited

U.S. PATENT DOCUMENTS

| 8,805,190 | B2 | 8/2014 | Lee et al. |
| 8,942,570 | B2 | 1/2015 | Schenk et al. |
| 8,948,600 | B2 | 2/2015 | Kwon et al. |
| 2008/0095373 | A1 | 4/2008 | Nagata et al. |
| 2009/0319797 | A1 | 12/2009 | Tornqvist |
| 2011/0145899 | A1* | 6/2011 | Cao ........................ H04L 9/3213 726/7 |

(Continued)

OTHER PUBLICATIONS

U.S. Appl. No. 14/689,778, Restriction Requirement dated Mar. 31, 2017, 6 pgs.

(Continued)

*Primary Examiner* — Yogesh Paliwal
(74) *Attorney, Agent, or Firm* — Schwegman Lundberg & Woessner, P.A.

(57) ABSTRACT

A secure server detects a login from a user originating from a first device. A second user-registered device is sent a message. The second device: translates the message into light-based communication that is captured by a camera of the first device, translates the message back into the original message, and sends the translated message to the secure server. The secure server authenticates the message and sends an indication to the first device that the second device is permitted to access the first device. In an embodiment, information passed between the first and second devices continue using light-based communications.

8 Claims, 4 Drawing Sheets

(56) References Cited

U.S. PATENT DOCUMENTS

| | | | |
|---|---|---|---|
| 2013/0152176 A1* | 6/2013 | Courtney | G06F 21/36 |
| | | | 726/5 |
| 2013/0219479 A1 | 8/2013 | DeSoto et al. | |
| 2014/0157392 A1* | 6/2014 | Smith | H04L 63/08 |
| | | | 726/9 |
| 2015/0065046 A1 | 3/2015 | Wilfred et al. | |
| 2015/0071647 A1 | 3/2015 | Suresh et al. | |
| 2015/0086213 A1 | 3/2015 | Pederson et al. | |
| 2015/0093107 A1 | 4/2015 | Jovicic et al. | |
| 2015/0098708 A1 | 4/2015 | Kido et al. | |
| 2016/0057135 A1 | 2/2016 | Jiang et al. | |
| 2016/0308863 A1 | 10/2016 | Burch et al. | |

OTHER PUBLICATIONS

U.S. Appl. No. 14/689,778, Response filed May 31, 2017 to Restriction Requirement dated Mar. 31, 2017, 6 pgs.

U.S. Appl. No. 14/689,778, Non Final Office Action dated Sep. 8, 2017, 11 pgs.

U.S. Appl. No. 14/689,778, Response filed Dec. 8, 2017 to Non Final Office Action dated Sep. 8, 2017, 6 pgs.

U.S. Appl. No. 14/689,778, Notice of Allowance dated Jan. 17, 2018, 5 pgs.

U.S. Appl. No. 14/689,778, Corrected Notice of Allowance dated Feb. 9, 2018, 5 pgs.

\* cited by examiner

WIRELESS INFORMATION PASSING AND AUTHENTICATION

This application is a continuation of U.S. patent application Ser. No. 14/689,778, filed Apr. 17, 2015, which is incorporated herein by reference in its entirety.

BACKGROUND

Consumers are using their mobile devices for a variety of purposes. Trends predict that mobile usage will continue to increase at alarming rates for the foreseeable future. Business and consumer transactions are regularly occurring away from the traditional desktop, office, and brick-and-mortar retail environments.

Presently, little security is focused on these transactions. In large part, confidential information between mobile devices takes place through a text message with a link or typed key from one device to the other. Assuming each party properly shields his/her mobile display from nearby prying eyes, the transaction may be relatively secure (this also assumes that one of the mobile devices is not stolen or otherwise compromised to maintain security).

The potential for security breaches are also more likely when a consumer authenticates at an ATM or other public Point-Of-Sale (POS) device and is required to enter a PIN. The ATM or POS may have a skimmer or may have others nearby who can visually detect or use technical devices (cameras, microphones, etc.) to detect the entered PIN.

Moreover, any time a mobile device needs to communicate with a secure backend-server or any other secure device (not just an ATM or POS), the need for improved security from what presently is available in the industry is needed. This is so because the mobile device may be compromised and expose the other device to which the mobile device connects to security vulnerabilities.

Therefore, there is a need for improved information passing and authentication.

SUMMARY

Various embodiments of the invention provide techniques for wireless information passing and authentication. In an embodiment, a method for wireless information passing and authentication is presented.

Specifically, a login is received for a user that originates from a first device over a first network. A message is generated in response to successfully logging in the user from the first device. The message is sent to a second device registered to the user. Subsequently, the message is sent back from the first device after the second device uses light-based communication to communicate the message from the second device to the first device. Finally, the message is verified and an indication is sent to the first device indicating that the second device is authenticated for communicating and accessing the first device.

DETAILED DESCRIPTION

A "resource" includes a user, service, system, device, directory, data store, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented as enhancements within existing network architectures and network-enabled devices.

Also, the techniques presented herein are implemented in (and reside within) machines, such as processor(s) or processor-enabled devices (hardware processors). These machines are configured and programmed to specifically perform the processing of the methods and system presented herein. Moreover, the methods and system are implemented and reside within a non-transitory computer-readable storage media or machine-readable storage medium and are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1-4.

Figure 1:
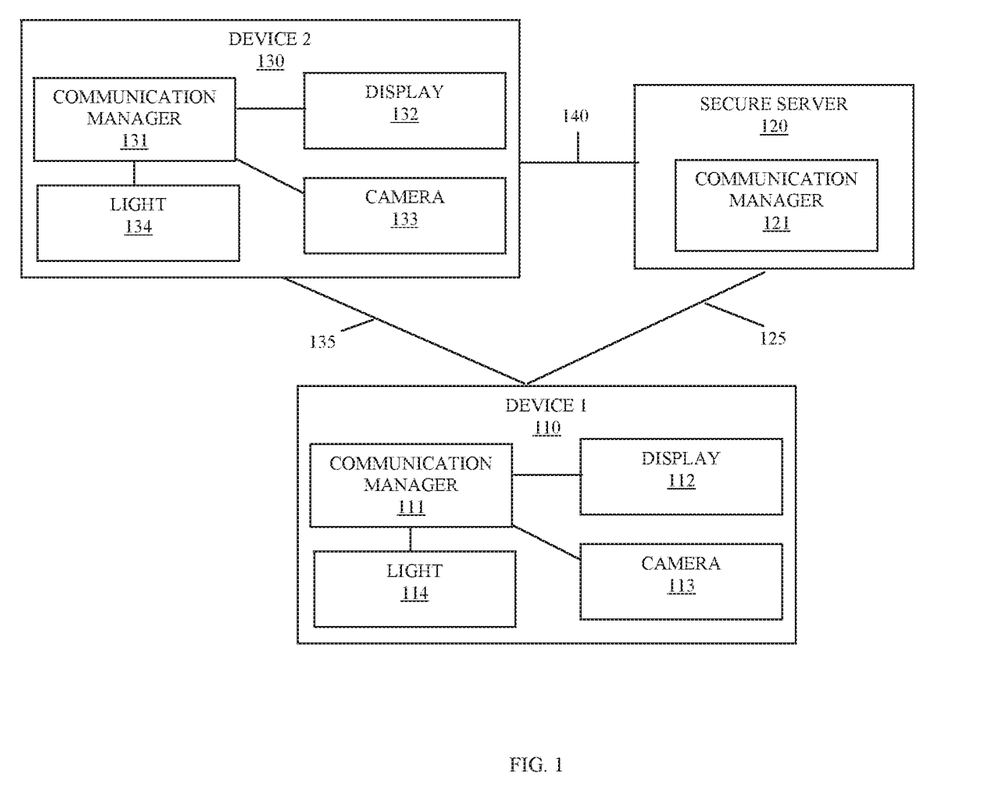
FIG. 1 is a diagram depicting an example wireless information passing and authentication system, according to an example embodiment.

FIG. 1 is a diagram depicting an example wireless information passing and authentication system, according to an example embodiment. It is noted that the system depicted in the FIG. 1 is shown in greatly simplified form with just those components necessary for understanding the teachings presented herein and below presented.

Moreover, the system of the FIG. 1 is one example illustration of how light-based information can be used for wireless information passing and authentication of a device seeking access to another device. It is noted that in some other embodiments other forms of light-based processing and other wireless transmission mediums besides light may be used.

The system depicted in the FIG. 1 includes a first device 110, a secure server 120, and a second device 130. The first device 110 includes a communication manager 111, a display 112, a camera 113, and a light source 114 (herein after just "light 114"). The secure server 120 includes a communication manager 121. The second device 130 includes a communication manager 131, a display 132, a camera 133, and a light 134.

The first device 110 communicates with the secure server 120 over a network transmission 125. The first device 110 also communicates with the second device 130 over a transmission medium 135. Moreover, the second device 130 communicates with the secure server 120 over transmission medium 140.

During operation of the system, a user operates the first device 110 for purposes of authenticating to and communicating with the secure server 120. This authentication and communication processing proceeds as follows.

The user operating the second device 130 logs into the secure server 120 and authenticates to the secure server 120. This login can be achieved using an enterprise-based application processing on the second device 130 or via a browser executing on the second device 130. Any authentication mechanism can be used such as, but not limited to: user identifier and password combination, secure token, assertion, certificate, biometric data, and the like.

In an embodiment, the second device 130 is a desktop computer.

In an embodiment, the second device 130 is a laptop computer.

In an embodiment, the second device 130 is a tablet.

In an embodiment, the second device 130 is a wearable processing device.

In an embodiment, the second device 130 is a mobile phone.

The secure server 120 authenticates the user to a user identity based on the successful login and sends a random challenge (message) to the first device 110. The user has previously registered the first device 110 with the secure server 120.

In an embodiment, the message is encrypted with one or more first device-specific keys before sent from the secure server 120 to the first device 110 over transmission medium 125. In an embodiment, the key(s) is symmetric. In an embodiment, the key(s) is asymmetric.

In an embodiment, the message sent by the secure server 120 is a Universal Resource Link (URL) that a browser executing on the first device 110 is automatically redirected to. The URL may include embedded authentication tokens as part of the URL; permitting authentication of the first device 110 to be automatic without action on the part of the user.

In an embodiment, the first device 110 is a mobile phone.

In an embodiment, the first device 110 is a tablet.

In an embodiment, the first device 110 is a laptop.

In an embodiment, the first device 110 is a wearable processing device.

The message is received by the first device 110 using a push channel, such as through the iOS® push notification method. This communication manager 111 is configured to detect the presenting of the message on the push channel.

Again, the message (random challenge) can be sent from the secure server 120 to the first device 110 over transmission medium 125, which can be through Wi-Fi, cellular, satellite, etc.

Next, the communication manager 111 of the first device 110 transforms the random challenge message into light pulses that are communicated from the first device 110 over transmission medium 135 (line-of-sight light-based medium).

In an embodiment, the message is communicated by the communication manager 111 by initiating light pulses of light 114 from the first device 110.

In an embodiment, the message is communicated by the communication manager 111 by causing a brightness of the display 112 from the first device 110 to pulsate.

The message received is communicated over transmission medium 135 as light-based information.

In an embodiment, before the message is sent out from the first device 110, the communication manager 111 encodes, encrypts, and/or digitally signs the message with a key stored on the first device 110.

In an embodiment, the communication manager 111 prompts the user to input a Personal Identification Number (PIN) or some other form of authentication to the first device 110 for verification by the communication manager 111 before the communication manager 111 begins to send the message out from the first device 110 over transmission medium 135.

In an embodiment, when the message is received by the communication manager 111 in an encrypted, encoded, and/or signed format, the communication manager 111 also uses a key resident and accessible to the first device 110 to decrypt, decode, and/or verify any signature before the message is sent out from the first device over transmission medium 135.

Once the message is being communicated from the first device 110 over transmission medium 135, the second device 130 captures the light-encoded message through camera 133. The communication manager 131 detects the presence of the captured images for the light-encoded messages from the camera 133 and decodes the message. The communication manager 131 then sends the decoded message (in a non-light-based format) to the secure server 120 over transmission medium 140.

The communication manager 121 of the secure server 120 validates the message received from the second device 130 over transmission medium 140 and when valid responds back to the communication manager 131 that it is acceptable to permit the first device 110 to establish a connection to the second device 130 and access resources of the second device 130 from the first device 110.

In an embodiment, access to the resources of the first device 110 from the second device 130 uses transmission medium 135 through light-based information passing.

In an embodiment, access to the resources of the first device 110 from the second device 130 uses a different transmission medium that can be wired or wireless. In an embodiment, the wireless transmission medium is one of Bluetooth®, Near Field Communication (NFC), Low Energy LE Bluetooth®, Infrared (IR), audio-based, and Wi-Fi.

The processing described above provides a mechanism for authentication the first device 110 for access to a second device 130. Moreover, the second device 130 has assurance that the first device 110 is in close proximity to the second device 130 because of the light-based message passage that necessarily requires line of sight between the first device 110 and the second device 130.

It is noted that the processing described above that is used to initially validate the first device 110 for access to the second device 130 can be reversed, such that the second device 130 is validated for access to the first device 110.

Still further communications between the first and second devices 110 and 130 can be entirely light based where the second device 130 sends light-based messages through the light 134 or varies display brightness to send the messages to the first device 110 (captured through camera 113). So, communication via light-based information can be two-way between the first and second devices 110 and 130.

Figure 2:
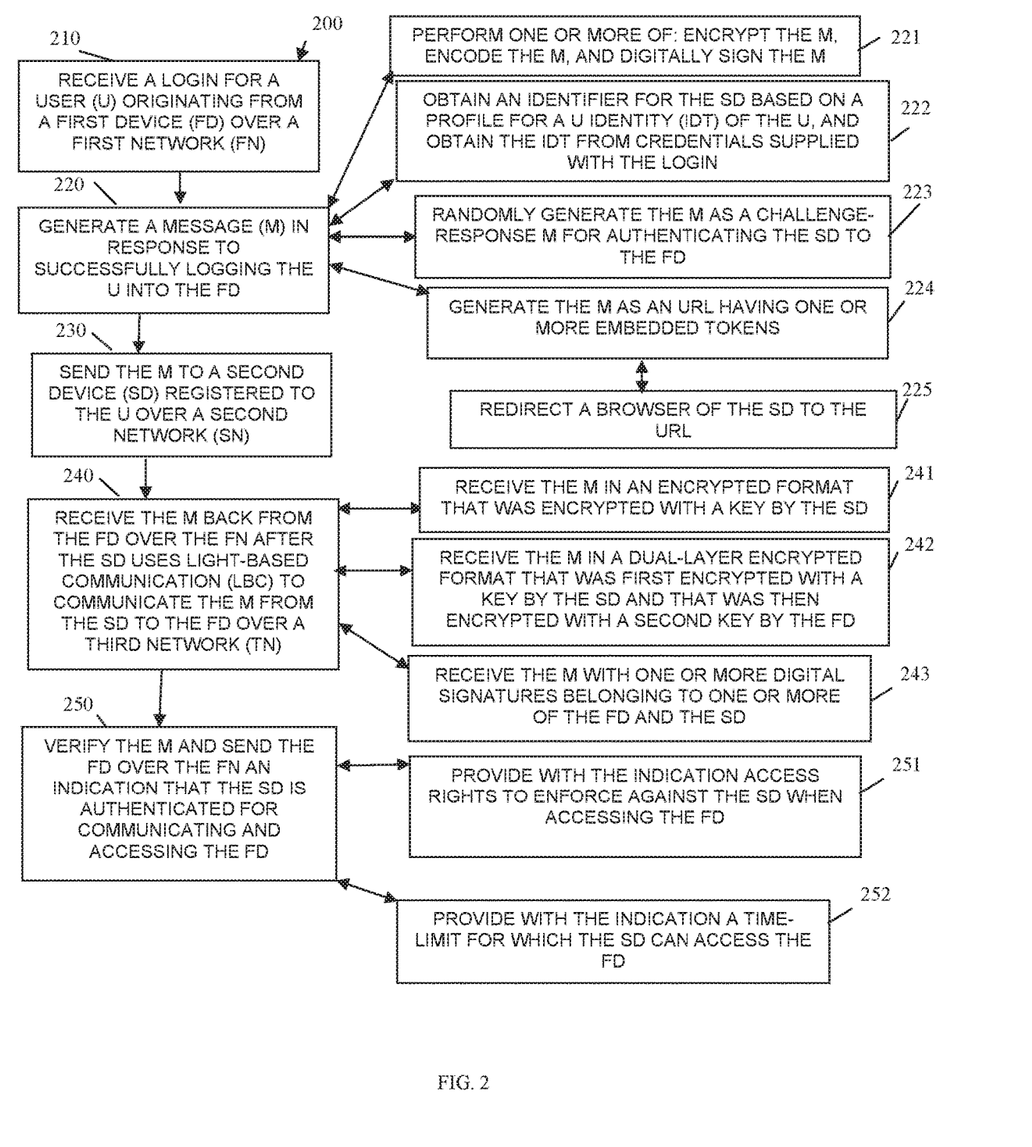
FIG. 2 is a diagram of a method for wirelessly information passing and authentication, according to an example embodiment.
Figure 3:
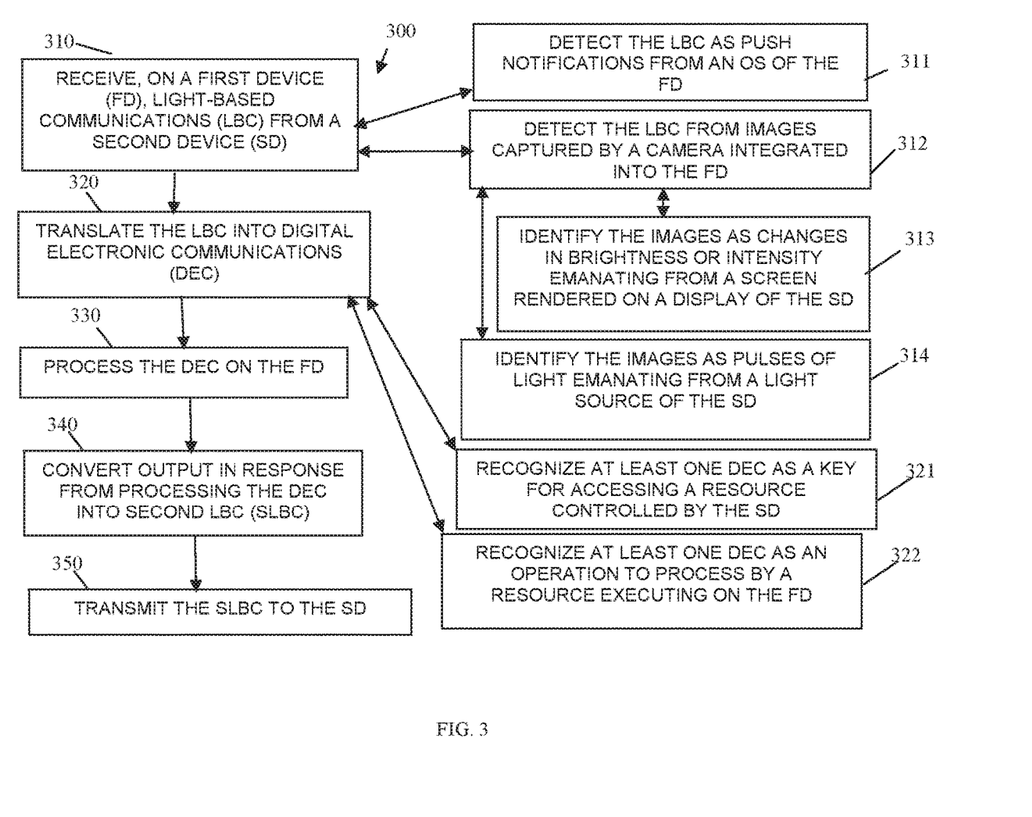
FIG. 3 is a diagram of another method for wireless information passing and authentication, according to an example embodiment.
Figure 4:
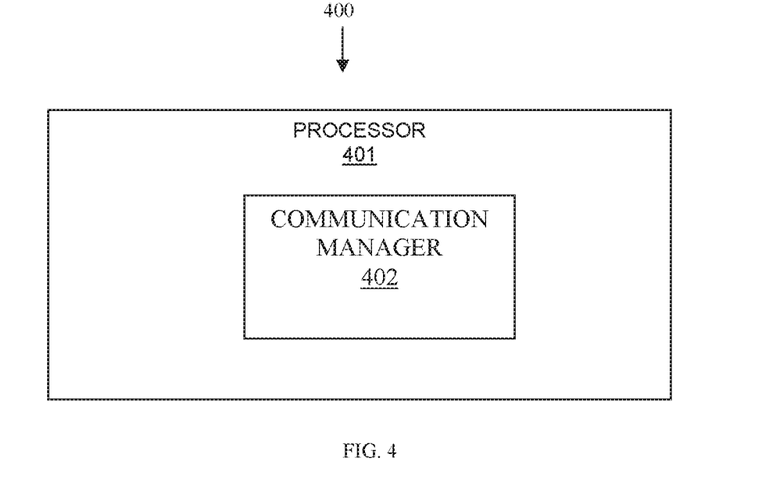
FIG. 4 is a diagram of a wireless information passing and authentication system, according to an embodiment.

Aspects of the embodiments discussed above and other embodiments are now presented with the discussion of the FIGS. 2-4.

FIG. 2 is a diagram of a method 200 for wirelessly information passing and authentication, according to an example embodiment. The method 200 is implemented as one or more software modules (herein after referred to as "server authenticator"). The server authenticator includes executable instructions that are implemented, programmed, and resides within memory and/or a non-transitory machine-readable storage media; the executable instructions execute on one or more processors of a server device and have access to one or more network connections associated with one or more networks. The networks may be wired, wireless, or a combination of wired and wireless.

In an embodiment, the server authenticator processes on a server.

In an embodiment, the server authenticator processes on the server 120 of the FIG. 1.

In an embodiment, the server authenticator processes on a cloud processing environment.

In an embodiment, the server authenticator is the communication manager 121 of the FIG. 1.

In an embodiment, the server authenticator interacts with two devices over different network transmission mediums. In an embodiment, the two devices are the first device 110 and the second device 130 of the FIG. 1. In an embodiment, the first device 110 is one of: a mobile phone, a wearable processing device, and a tablet. In an embodiment, the second device 130 is one of a desktop and a laptop.

In an embodiment, the server authenticator interacts with the communication manager 111 and the communication manager 131 of the FIG. 1.

At 210, the server authenticator receives a login for a user that originates from a first device over a first network. In an embodiment, the first device is a desktop computer that is networked to the server that executes the server authenticator over the first network. The first network can be wired, wireless, or a combination of wired and wireless.

At 220, the server authenticator generates a message in response to successfully logging in the user from the first device. In an embodiment, the user is presented with options when logging in successfully and indicates that the user desires to use a second device to access the first device. In an embodiment, the type of login is an automatic indication that the user desires to use the second device to access the first device. In an embodiment, the credentials supplied by the user during the login are an automatic indication that the user desires to use the second device to access the first device.

According to an embodiment, at 221, the server authenticator performs processing on the generated message to one or more of: encrypt the message, encode the message, and/or digitally sign the message.

In an embodiment, at 222, the server authenticator obtains an identifier for the second device based on a profile for a user identity of the user. The server authenticator obtains the user identity from credentials supplied with the login.

In an embodiment, at 223, the server authenticator randomly generates the message as a challenge-response message for authenticating the second device to the first device.

In an embodiment, at 224, the server authenticator generates the message as an URL having one or more embedded tokens and/or assertions used for authenticating the second device.

In an embodiment of 224 and at 225, the server authenticator sends the URL to force redirection of a browser executing on the second device to the URL. This was discussed above with reference to the system of the FIG. 1.

At 230, the server authenticator sends the message to a second device registered to the user over a second network.

At 240, the server authenticator subsequently receives the message back from the first device over the first network after the second device uses light-based communication to communicate the message from the second device to the first device over a third network (a light-based communication network between the first and second device and the server authenticator does not participate in the third network).

In an embodiment, at 241, the server authenticator receives the message in an encrypted format that was encrypted with a key by the second device.

In an embodiment, at 242, the server authenticator receives the message in a dual-layer encrypted format that was first encrypted with a key by the second device and that was then encrypted with a second key by the first device.

According to an embodiment, at 243, the server authenticator receives the message with one or more digital signatures belonging to one or more of the first device and the second device.

At 250, the server authenticator verifies the message and sends the first device, over the first network, an indication that the second device is authenticated for communicating and accessing the first device.

In an embodiment, at 251, the server authenticator provides with the indication access rights to enforce against the second device when accessing the first device.

In an embodiment, at 252, the server authenticator provides with the indication a time-limit for which the second device can access the first device.

FIG. 3 is a diagram of another method 300 for wireless information passing and authentication, according to an example embodiment. The method 300 is implemented as one or more software module(s) (herein after referred to as "client communicator") on a device. The client communicator is represented as executable instructions that are implemented, programmed, and resides within memory and/or a non-transitory machine-readable storage medium; the executable instructions execute on one or more processors of the device and have access to one or more network connections associated with one or more networks. The networks may be wired, wireless, or a combination of wired and wireless.

In an embodiment, the client communicator executes on first device 110 and interacts through wireless communication with the second device 130 of the FIG. 1.

In an embodiment, the client communicator executes on the second device 130 and interacts through wireless communication with the first device 100 of the FIG. 1.

In an embodiment, the client communicator is the communication manager 111 of the FIG. 1.

In an embodiment, the client communicator is the client communicator 131 of the FIG. 1.

In an embodiment, the client communicator interacts with the communication manager 121 of the FIG. 1.

In an embodiment, the client communicator interacts with the method 200 of the FIG. 2.

In an embodiment, the client communicator is a mobile application (app) dynamically downloaded and initiated on one or more of the first device 110 and the second device 130. In an embodiment, the first device 110 is one of: a tablet, a mobile phone, and a wearable processing device. In an embodiment, the second device 130 is one of: a desktop computer and a laptop computer.

At 310, the client communicator receives light-based communications from a second device.

According to an embodiment, at 311, the client communicator detects the light-based communications as push notifications from an operating system of the first device (device executing the client communicator).

In an embodiment, at 312, the client communicator detects the light-based communications from images captured by a camera integrated into the first device.

In an embodiment of 312 and at 313, the client communicator identifies the images as changes in brightness and/or intensity emanating from a screen rendered on a display of the second device.

In another embodiment of 312 and at 314, the client communicator identifies the images as pulses of light emanating from a light source of the second device.

At 320, the client communicator translates the light-based communications into digital electronic communications.

According to an embodiment, at 321, the client communicator recognizes at least one electronic communication as a key for accessing a resource controlled by the second device.

In an embodiment, at 322, the client communicator recognizes at least one electronic communication as an operation to process by a resource executing on the first device.

At 330, the client communicator processes the electronic communications on the first device.

At 340, the client communicator converts output in response from processing the electronic communications into second light-based communications.

At 350, the client communicator transmits the second light-based communications to the second device.

In an embodiment, the first device is a Point-Of-Sale (POS) device and the second device is a mobile device. The client communicator executing on the POS device uses light-based communications to process and conclude with payment a transaction at the POS device with the mobile device.

In an embodiment, the first device is an Automated Teller Machine (ATM) and the second device is a mobile device. The client communicator executing on the ATM uses light-based communications to authentication and perform a financial transaction at the ATM device with the mobile device.

In an embodiment, the first device is a mobile device and the second device is a retail-based digital sign or POS terminal. The client communicator executing on the mobile device and the digital sign or POS terminal broadcasting light-based communications detected by the mobile device as offers, coupons, and/or advertisements.

In an embodiment, both the first and second devices are mobile devices and each includes an operating instance of the client communicator. The mobile devices engage in private, and in some cases encrypted, light-based communications between one another as long as the two mobile devices are in line of sight of one another or natural or artificial lighting does not interfere with the light-based communications the distances between the two mobile devices can be increased.

FIG. 4 is a diagram of a wireless information passing and authentication system 400, according to an embodiment. Various components of the wireless information passing and authentication system 400 are software module(s) represented as executable instructions, which are programmed and/or reside within memory and/or non-transitory computer-readable storage media for execution by one or more devices. The components and the devices have access to one or more network connections over one or more networks, which are wired, wireless, or a combination of wired and wireless.

In an embodiment, the wireless information passing and authentication system 400 implements, inter alia, the system depicted in the FIG. 1, the method 200 of the FIG. 2, and the method 300 of the FIG. 3. Accordingly, embodiments discussed above with respect to the FIGS. 1-3 are incorporated by reference herein with the discussion of the wireless information passing and authentication system 400.

The wireless information passing and authentication system 400 includes a processor 401 and a communication manager 401.

In an embodiment, the processor 401 is part of a server.

In an embodiment, the server is the server 120 of the FIG. 1.

In an embodiment, the processor 401 is part of a cloud processing environment.

The communication manager 402 is configured and adapted to: execute on the processor 401 and facilitate authentication of a requesting device to access a source device through light-based communication between the requesting device and the source device.

In an embodiment, the communication manager 402 is further configured and adapted to: communicate with the source device over a first network and communicate with the requesting device over a second network. The first and second networks are different networks. Moreover, the requesting device and the source device communicate over a third network for the light-based communications. The third network is different from the first and second networks. Furthermore, the communication manager 402 does not communicate over the third network at all.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   receiving, by a secure server, a successful logon from a first device for access to a second device;
   sending, by the secure server, a message to the second device;

obtaining, by the secure server, a response message from the first device based on a line-of-sight and light-based communication that is communicated by the second device to the first device and that provides an encrypted version of the message through the line-of-sight and light-based communication to a camera of the first device, wherein the first device decrypts the encrypted version of the message and provides back to the secure server as the response message;

authenticating, by the secure server, the response message received from the first device based at least in part on the message originally sent to the second device; and instructing, by the secure server, the first device to allow the second device to establish a connection with the first device and access a resource of the first device based on the authenticating.

2. The method of claim 1, wherein sending further includes pushing the message to the second device as an operating system push notification.

3. The method of claim 1, wherein sending further includes encrypting the message with a key associated with the second device before sending the message to the second device.

4. The method of claim 1, wherein sending further includes, randomly generating a challenge message and sending the challenge message to the second device as the message.

5. The method of claim 1, wherein sending further includes sending the message as a Universal Resource Link (URL) that redirects a browser of the second device, and wherein the URL includes at least one embedded authentication token that the second device communicates to the first device in the line-of-sight and light-based communication.

6. The method of claim 1, wherein instructing further includes providing the first device with access rights that are to be enforced by the first device against the second device when the second device has the connection with the first device and is accessing the resource of the first device.

7. A system, comprising:
a secure server comprising a processor and a non-transitory computer-readable storage medium;
the non-transitory computer-readable storage medium comprising executable instructions; and
the executable instructions when executed by the processor from the non-transitory computer-readable storage medium cause the processor to perform processing comprising:
receiving a successful login from a first device requesting access to a resource of a second device;
generating a message based on the receiving;
sending the message to the second device;
obtaining a response message from the first device, based on a line-of-sight and light-based communication that is communicated by the second device to the first device and that provides an encrypted version of the message through the line-of-sight and light-based communication to a camera of the first device, wherein the first device decrypts the encrypted version of the message and provides back to the secure server as the response message;
authenticating the response message received from the first device based at least in part on the message originally sent to the second device; and
instructing the first device to allow the second device to establish a connection with the first device and access the resource of the first device based on the authenticating.

8. The system of claim 7, wherein the connection between the first device and the second device is:
a Wi-Fi connection between the first device and the second device, a light-based connection between the first device and the second device that utilizes light pulses for communication between the first device and the second device during the connection, an Infrared (IR) connection between the first device and the second device, a Near Field Communication (NFC) connection between the first device and the second device, an audio-based connection between the first device and the second device, or a short-range Radio Frequency (RF) connection between the first device and the second device.

* * * * *